US005727533A

United States Patent [19]

Bidner et al.

[11] Patent Number: 5,727,533

[45] Date of Patent: Mar. 17, 1998

[54] METHOD AND APPARATUS FOR MONITORING EGR SYSTEM FLOW

[75] Inventors: David Karl Bidner, Livonia; Alexander Y. Gopp, Ann Arbor; Shailesh Natwarlal Patel, Garden City, all of Mich.

[73] Assignee: Ford Global Technologies, Inc., Dearborn, Mich.

[21] Appl. No.: 733,853

[22] Filed: Oct. 18, 1996

[51] Int. Cl.$^6$ .............................. F02M 25/07; G01L 3/26

[52] U.S. Cl. .............................. 123/571; 73/117.3

[58] Field of Search .............................. 123/568, 569, 123/571; 73/117.3

[56] References Cited

U.S. PATENT DOCUMENTS

| | | | |
|---|---|---|---|
| 4,462,376 | 7/1984 | Ripper et al. | 123/571 |
| 4,793,318 | 12/1988 | Tsurusaki | 123/571 |
| 4,870,941 | 10/1989 | Hisatomi | 123/571 |
| 4,967,717 | 11/1990 | Miyazaki et al. | 123/571 |
| 4,974,572 | 12/1990 | Aramaki | 123/571 |
| 5,014,203 | 5/1991 | Miyazaki et al. | 123/571 |
| 5,140,961 | 8/1992 | Sawamoto et al. | 123/419 |
| 5,209,212 | 5/1993 | Viess et al. | 123/571 |
| 5,619,974 | 4/1997 | Rodefeld et al. | 123/571 |

OTHER PUBLICATIONS

SAE Technical Paper No. 912433, "Overview of On-Board Diagnostic Systems Used On 1991 California Vehicles", by Michael A. Bogdanoff, Oct. 7–10, 1991, pp. 1–3.

*Primary Examiner*—Willis R. Wolfe
*Attorney, Agent, or Firm*—Allan J. Lippa; Roger L. May

[57] ABSTRACT

A method and apparatus for monitoring an EGR system during normal vehicle operations is disclosed. An EGR valve located in an EGR passage controls the flow of exhaust gas to an intake manifold, and a sensor disposed in the air intake manifold downstream of air and EGR confluence point, monitors temperature of the mixture. A controller calculates a correlation function between a calculated desired EGR flow and the output of the manifold temperature sensor. If the value of correlation function is lower than a reference level, the monitoring system deterioration of EGR flow rate is indicated.

12 Claims, 2 Drawing Sheets

METHOD AND APPARATUS FOR MONITORING EGR SYSTEM FLOW

TECHNICAL FIELD

This invention relates to monitoring the abnormal conditions of an exhaust gas recirculation (EGR) system of an internal combustion engine and, more particularly, to a method and apparatus for relating the manifold temperature to EGR flow measurement and/or flow presence.

BACKGROUND ART

Abnormal conditions occur in EGR systems when delivered EGR flow is lower than a desired EGR flow determined by an engine control system. This is mostly due to a clogging of EGR control valve or EGR passage to an air inlet manifold, and results in increased $NO_x$ emission from an internal combustion engine, and may also lead to loss of fuel economy and engine knocking.

It is known in the prior art that a temperature sensor disposed in the EGR passage upstream or downstream in the vicinity of the EGR valve may detect the presence of EGR flow (see U.S. Pat. Nos. 4,793,318, 4,870,941, and 4,974,572). The temperature sensor in a such location is subject to high temperature and is an add-on sensor for the sole purpose of EGR monitoring. The additional sensor increases complexity and cost of a monitoring apparatus.

SUMMARY OF THE INVENTION

It is, therefore, an object of the invention to provide a method that is capable of monitoring a vehicle EGR system with a low cost, low temperature sensor disposed in the air intake manifold downstream of the inlet air and EGR confluence point.

In accordance with the present invention, the manifold temperature sensor is used for EGR monitoring. In certain engine control systems, a manifold temperature sensor is available and can be used for EGR monitoring apparatus. Otherwise, a manifold temperature sensor is added for this purpose.

There are, however, difficulties in using a manifold temperature sensor for this purpose related to its location in the air intake manifold far removed from the influences of exhaust gas. At steady-state conditions, even sharp changes in EGR flow rate lead to small changes in the manifold temperature of inlet air/exhaust gas mix, in most cases not exceeding 3° to 5° C. During normal vehicle operations, a manifold temperature sensor is apt to be influenced by the temperature of outside inlet air, and these effects are much larger than subtle changes in manifold temperature due to EGR flow changes. Simple observation of the manifold temperature sensor output does not provide any visible information about EGR flow and especially of its abnormality.

However, we have discovered a correlation between desired EGR flow as determined by an engine control system and manifold temperature as measured by a manifold temperature sensor. This correlation is revealed by proper signal processing based on correlation analysis. Specifically, there is provided a monitoring apparatus comprising a manifold temperature sensor and a low pass filter for aligning the desired EGR flow with expected manifold temperature changes. A high pass filter conditions and removes an offset from the desired EGR flow and a second high pass filter conditions and removes an offset from the manifold temperature sensor output signal. A controller calculates one point of a cross correlation function between outputs of the first and second high pass filters and normalizes a correlation function. The controller detects a degradation of the EGR flow by a comparison of the normalized correlation function with a predetermined reference level. The controller also determines an entry condition when EGR monitoring can be effective, and verifies the validity of the acquired EGR data during a current trip.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
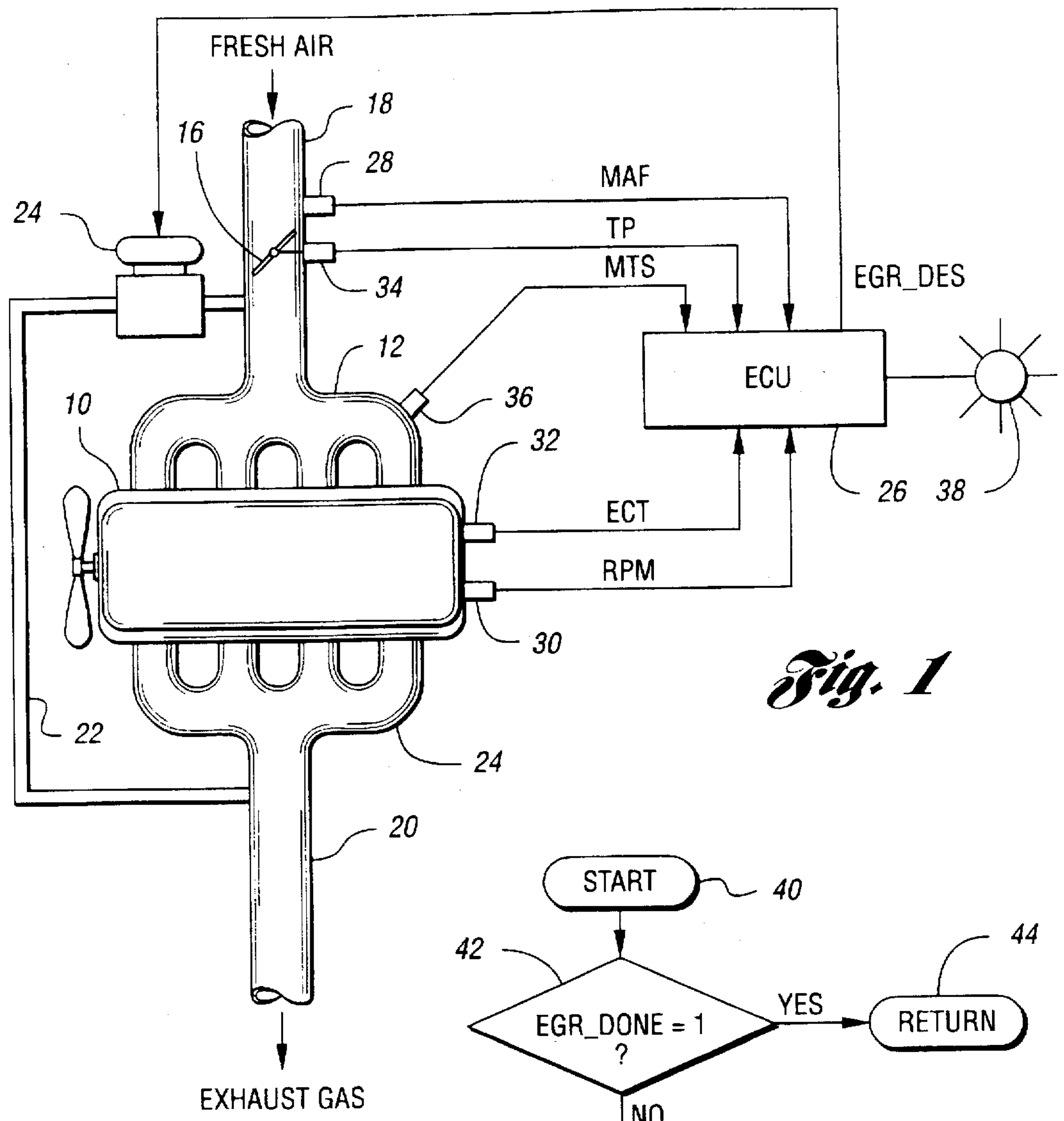
FIG. 1 is a simplified schematic diagram of an embodiment of an apparatus for EGR system monitoring according to the invention.

Referring now to the drawing and initially to FIG. 1, an internal combustion engine 10 is shown equipped with an air inlet manifold 12 and exhaust manifold 14. Throttle 16 controls an amount of inlet fresh air admitted to inlet manifold 12 through a fresh air conduit 18. Exhaust gas from exhaust manifold 14 is discharged through an exhaust pipe 20. A small part of exhaust gas is recirculated via exhaust gas passage 22 to inlet manifold 12, the amount of exhaust gas is controlled by EGR valve 24. Engine control unit 26 collects information about engine conditions and provides control outputs to various control systems. FIG. 1 shows only those input and output signals which are pertinent to EGR control and monitoring according to the invention. Mass air flow (MAF) sensor 28 and engine speed (RPM) sensor 30 provides vital information for calculating desired EGR flow EGR_DES as a function of engine speed and load. Engine coolant temperature (ECT) sensor 32 and throttle position (TP) sensor 34 provide information to modify if so desired, the amount of EGR flow. For example, EGR flow may be completely cut off during vehicle deceleration and wide open throttle operations. EGR flow is usually reduced until the engine is warmed up as indicated by coolant temperature sensor 32. Manifold temperature sensor (MTS) 36 is located in the inlet manifold 102 downstream of a confluence point of inlet air and recirculated exhaust gas. Control unit 26 controls EGR valve 24 and monitors EGR system conditions. If abnormal low EGR flow is detected, engine control unit 26 energizes indication lamp 38.

Engine control unit 26 may be any well known microcomputer capable of calculating and storing data. Operation of the microcomputer in accordance with the invention will be explained with references to the flowchart shown in FIGS. 2*a* and 2*b*. Before start of an EGR monitoring routine in step 40, the engine control unit 26 has already obtained and stored all input sensor data pertinent to the monitoring, and calculated EGR desired flow EGR_DES. Government regulations require an EGR monitoring once per trip, and decision block 42 verifies, by checking flag EGR_DONE, whether EGR monitoring has already been done during this trip. If true, the routine exits at step 44. Flag EGR_DONE is set to 1 after completion of EGR monitoring as will be described hereinafter. If EGR monitoring has not been done, the routine proceeds to step 46 to check EGR monitoring entry conditions. Entry conditions include but are not limited to elapsed time since engine start, engine coolant temperature and manifold temperature, how many times EGR flow has previously been requested, and the like. These entry conditions are application dependent and should indicate that EGR passage 22 and EGR valve 24 have been sufficiently warmed up. If entry conditions are not met, the routine exits in step 48 to attempt EGR monitoring later, otherwise, it proceeds to step 50 to start a monitoring timer TMR. The timer ensures that EGR monitoring is completed before government mandated trip time expires. For practical purposes, the EGR monitoring time $T_{MON}$ may be as long as 10 minutes. Then the routine collects data in step 52 regarding monitoring conditions such as the vehicle driving pattern to be used in the final decision making process. As mentioned above, EGR monitoring does not use any artificially injected test signals and completely relies upon driver input. However, different driving conditions may not exercise enough EGR control to make an intelligent decision about EGR system functionality. The examples of unacceptable driving patterns are excessive idling or driving with wide open throttle. Therefore, a data validity check may include the total time EGR is turned off during this EGR monitoring time, the number of times the EGR system was turned on and off, and the like. Step 52 is similar to step 46 in that it is application dependent.

The following describes the theory of the EGR monitoring method of the present invention and the calculations performed in carrying out the method. The method seeks to find and quantify correlation between a required action, EGR_DES command issued by an engine control unit, and an expected reaction, a change in manifold temperature as indicated by manifold temperature sensor 36. It is known in the art that the cross correlation function Rxy between two time dependent signals x(t) and y(t) can be employed to reveal this type of relationship. Cross correlation function Rxy in its digital form is defined by the following equation:

$$Rxy(\tau)=1/(n*\Delta t)*\Sigma x(i)*y(i-\tau)$$

where n is a number of data acquisition points, and Δt is the sampling interval. Direct implementation of this formula requires τ/Δt memory locations and is difficult to interpret. Therefore, the invention uses only the first term of the equation where τ=0, and the correlation function used is:

$$Rxy=1/(n*\Delta t)*\Sigma x(i)*y(i).$$

Two signals x(i) and y(i) are derived from EGR_DES and manifold temperature sensor signals after certain digital signal processing. First, the reaction signal MTS is delayed from the action signal EGR_DES by filtering effects of the inlet manifold filling and heating. Therefore, the EGR_DES signal used in the EGR monitoring is delayed by applying a low pass filter. Second, both signals EGR_DES and MTS have significant variable offsets, and their product is a strong function of those offsets, for example, ambient fresh air temperature. Therefore, a high pass filter is used to remove the offset. Any digital implementation of low pass and high pass filters can be used in the invention. As an example, a low pass filter may be presented in the form:

$$y_{LP}(i)=(a-\alpha)*y_{LP}(i-1)+\alpha*x_{IN}(i)$$

where:

$Y_{LP}$ and $x_{IN}$ are output and input respectively of the low pass filter, and α is the low pass filter time constant.

A high pass filter may be presented in the form:

$$y_{HP}(i)=x_{IN}(i)-y_{LP}(i)$$

where:

$y_{HP}$ and $x_{IN}$ are output and input respectively of the high pass filter, and $y_{LP}$ is an output of another low pass filter with the same input $x_{IN}$.

Figure 2A:
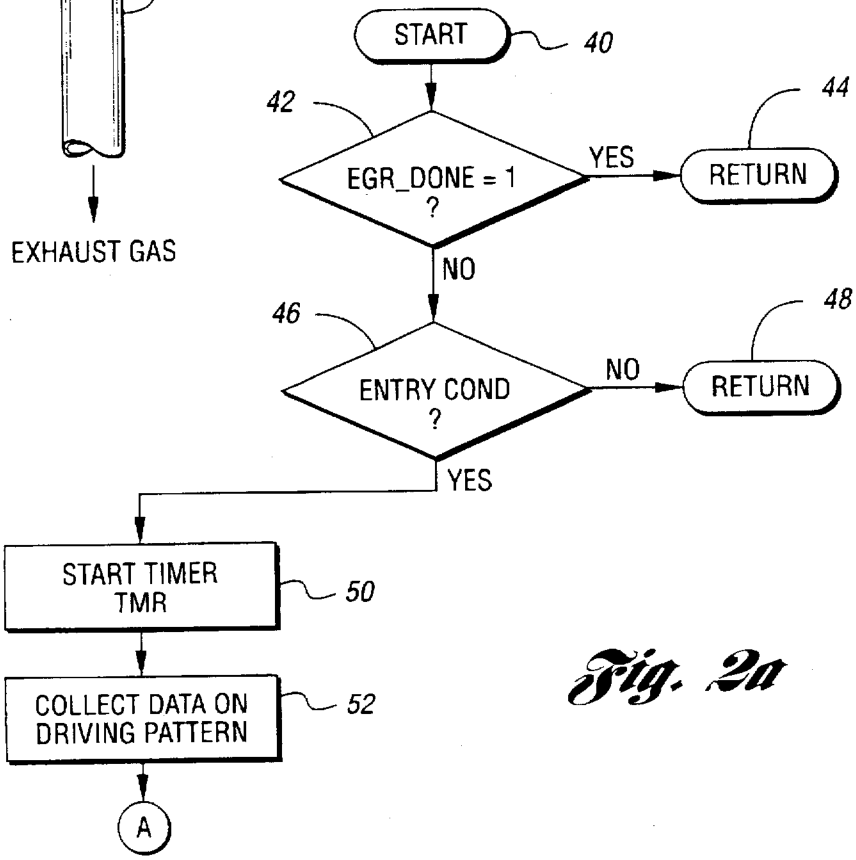
FIGS. 2*a* and 2*b* are flowcharts of a routine showing different steps for executing the EGR monitoring method according to the invention.
Figure 2B:
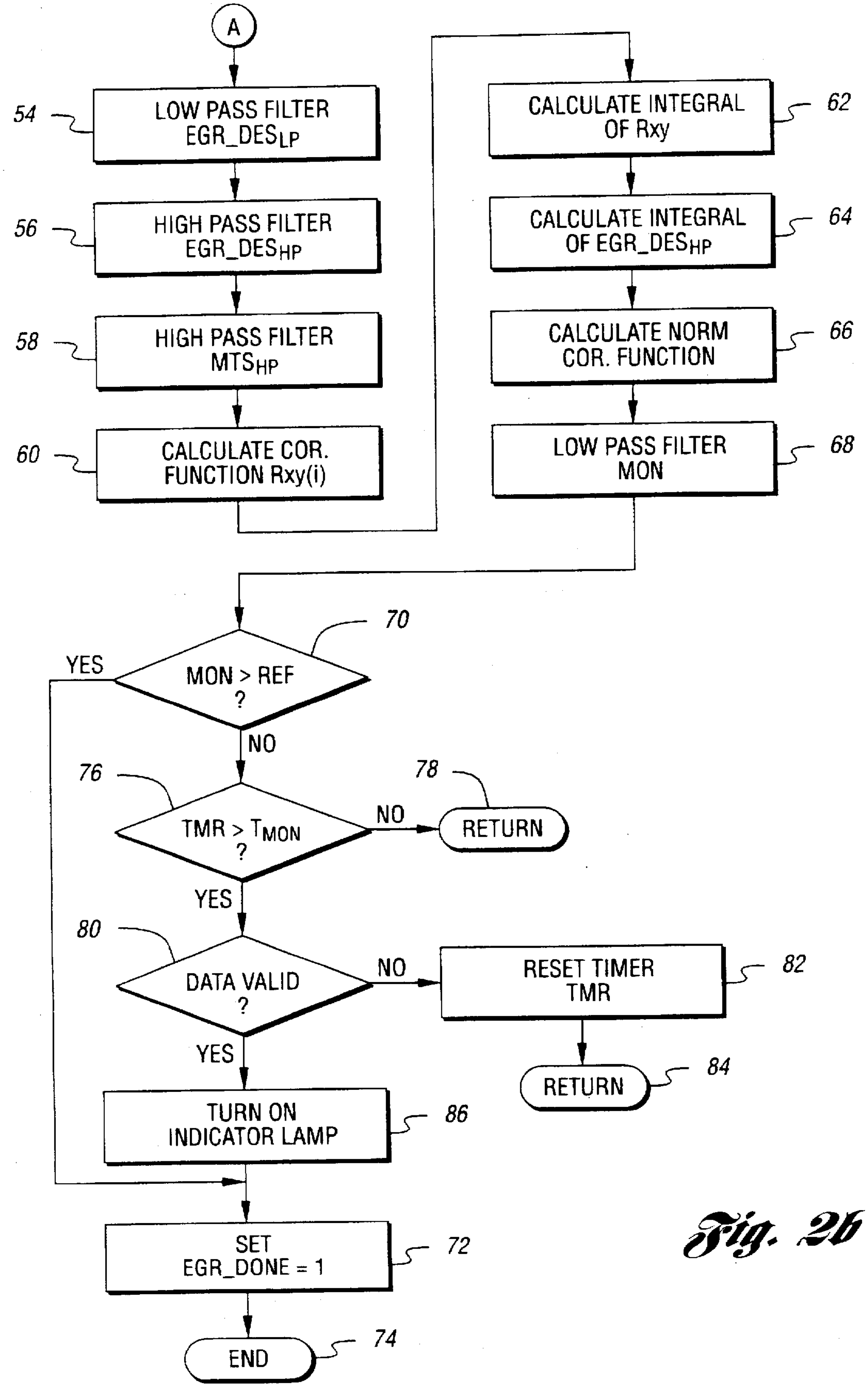

Returning now to the description of the flowchart in FIGS. 2a and 2b and particularly FIG. 2b, in step 54, a low pass filtering function is applied to the EGR_DES signal to delay the signal. In step 56, a high pass filtering function is applied to the output signal of step 54 to produce the output signal $EGR\_DES_{HP}(i)$. Similarly, in step 58, a high pass filter is applied to the MTS output signal to produce the output signal $MTS_{HP}(i)$. Step 60 calculates the current value of the correlation function in the form:

$$Rxy(i)=EGR\_DES_{HP}(i)*MTS_{HP}(i).$$

Step 62 produces an integrated value of the cross correlation function in accordance with the above-mentioned formula in the form:

$$Rxy\_SUM=Rxy\_SUM+Rxy(i).$$

Step 64 calculates an integrated normalizing value $$EGR\_SUM=EGR\_SUM+EGR\_DES_{HP}(i).$$

Then, step 66 calculates a normalized correlation function:

$$R\_NORM=Rxy\_SUM/EGR\_SUM.$$

The output of step 66 is smoothed by a low pass filter in step 68 to avoid sharp changes especially in the beginning stages of EGR monitoring. The output of step 68 is the EGR monitoring criterion MON.

After start of EGR monitoring, the value of the EGR monitoring criterion MON is changing until it reaches some stable level. It has been shown that during normal engine operations, the value of the criterion corresponds to a degree of EGR flow degradation. Thus, comparing the criterion with a predetermined reference value REF provides an indication that the EGR system has degraded below acceptable levels. This comparison is done in step 70, and if MON>REF, an acceptable performance of the EGR system is indicated. At step 72 the EGR_DONE flag is set to EGR_DONE=1 indicating the completion of EGR monitoring for the current trip, and the EGR monitoring routine ends in step 74.

However, if the condition in step 70 is not satisfied, step 76 check whether the total time $T_{MON}$ allocated to EGR monitoring has elapsed. If the time has not elapsed, the routine exits in step 78, and will be executed again next time. If step 76 indicates that time has expired, step 80 checks validity of the current EGR monitoring data. If, for example, there was an excessive idling during this trip, step 80 rejects accumulated data, reset the monitoring timer TMR in step 82, and the routine exits in step 84 to be repeated again with TMR set to zero. Otherwise, if step 80 accepts the monitoring data as valid, step 86 turns on an indicating light, sets the EGR_DONE flag to 1 in step 72, and EGR monitoring routine ends in step 74.

While the best mode for carrying out the present invention has been described in detail, those familiar with the art to which this invention relates will recognize various alternative designs and embodiments for practicing the invention as defined by the following claims.

What is claimed is:

1. A method of monitoring the condition of an exhaust gas recirculation (EGR) system during normal vehicle operations comprising a sequence of the following steps:

collecting data on vehicle driving pattern;

calculating a desired EGR flow;

sensing the temperature of the mixture of intake manifold air and recirculated gas;

low pass filtering said desired EGR flow to compensate for the effects of inlet manifold filling and heating;

high pass filtering said low pass filtered EGR flow to condition said desired EGR flow;

high pass filtering the sensed manifold temperature to condition said sensed manifold temperature;

calculating the current value of the correlation function based on the product of current values of the high pass filtered desired EGR flow and high passed filtered sensed manifold temperature;

integrating the current values of the cross correlation function;

calculating an integrated normalizing value of desired EGR flow;

calculating a normalized correlation function by dividing said current value of the correlation function by said integrated normalizing value of desired EGR flow;

low pass filtering the normalized integrated correlation function to obtain an EGR monitoring criterion value;

comparing said criterion value with said reference value;

indicating proper operation of said EGR system if said criterion value is greater than said reference value; and indicating EGR flow degradation if said criterion value is less than said reference value, the total time allocated to EGR monitoring has exceeded a predetermined time interval, and the vehicle driving pattern data is valid.

2. Apparatus for monitoring an exhaust gas recirculation (EGR) system during normal vehicle operations comprising:

an EGR valve located in an EGR passage for controlling the flow of exhaust gas to an intake manifold;

a temperature sensor disposed in the air intake manifold downstream of a location where intake manifold air and recirculating exhaust gas flow together;

a controller for controlling said valve and for calculating a correlation function between a desired EGR flow and the temperature detected by said sensor, and for controlling an indicator if the value of the correlation function is below a reference level.

3. The system defined in claim 2 wherein said controller includes:

means for timing the EGR monitoring;

means for collecting data on vehicle driving pattern;

means for calculating a desired EGR flow;

means for low pass filtering said desired EGR flow;

means for high pass filtering said low pass filtered EGR flow;

means for high pass filtering the sensed manifold temperature;

means for calculating the current value of the correlation function based on the product of current values of the high pass filtered desired EGR flow and high passed filtered sensed manifold temperature;

means for integrating the current values of the cross correlation function;

means for calculating an integrated normalizing value of desired EGR flow;

means for calculating a normalized correlation function by dividing said current value of the correlation function by said integrated normalizing value of desired EGR flow;

means for low pass filtering the normalized integrated correlation function to obtain an EGR monitoring criterion value;

means for comparing said criterion value with said reference value;

means for indicating proper operation of said EGR system if said criterion value is greater than said reference value; and means for indicating EGR flow degradation if said criterion value is less than said reference value, the total time allocated to EGR monitoring has exceeded a predetermined time interval, and the vehicle driving pattern data is valid.

4. A method of monitoring the condition of an exhaust gas recirculation (EGR) system during normal vehicle operations, comprising a sequence of the following steps:

calculating a desired EGR flow;

sensing the temperature of a mixture of intake manifold air and recirculated gas;

calculating a cross correlation function between the desired EGR flow and the sensed temperature; and comparing the value of said cross correlation function with a predetermined reference value to determine whether the delivered EGR flow is below a predetermined acceptable level.

5. The invention defined in claim 4 comprising the further steps of:

compensating said desired EGR flow for the effects of inlet manifold filling and heating; and removing an offset from said desired EGR flow and said sensed manifold temperature.

6. The invention defined in claim 4 comprising the further steps of:

low pass filtering said desired EGR flow to compensate for the effects of inlet manifold filling and heating;

high pass filtering said low pass filtered EGR flow to condition said desired EGR flow; and high pass filtering the sensed manifold temperature to condition said sensed manifold temperature.

7. The invention defined in claim 6 wherein the step of calculating said cross correlation function includes the steps of:

calculating the current value of the correlation function based on the product of current values of the high pass filtered desired EGR flow and sensed high pass filtered manifold temperature;

integrating the current values of the cross correlation function;

calculating an integrated normalizing value of desired EGR flow;

calculating a normalized correlation function by dividing said current value of the correlation function by said integrated normalizing value of desired EGR flow; and comparing the value of said normalized correlation function with said reference value.

8. The method defined in claim 7 comprising the further step of:

indicating proper operation of said EGR system if said criterion value is greater than said reference value.

9. The method defined in claim 7 comprising the further step of:

indicating EGR flow degradation if said criterion value is less than said reference value.

10. The method defined in claim 7 comprising the further step of:

indicating EGR flow degradation if said criterion value is less than said reference value and the total time allocated to EGR monitoring has exceeded a predetermined time interval.

11. The method defined in claim 7 comprising the further step of:

indicating EGR flow degradation if said criterion value is less than said reference value and the current EGR monitoring data is valid.

12. The method defined in claim 7 comprising the further step of:

indicating EGR flow degradation if said criterion value is less than said reference value, the total time allocated to EGR monitoring has exceeded a predetermined time interval, and the current EGR monitoring data is valid.

* * * * *